United States Patent [19]
Hellberg et al.

[11] 3,875,291
[45] Apr. 1, 1975

[54] PROCESS FOR MAKING CRYOLITE

[75] Inventors: Karl-Heinz Hellberg; Joachim Massonne, both of Hannover, Germany

[73] Assignee: Kali-Chemie Aktiengesellschaft, Hannover, Germany

[22] Filed: May 31, 1973

[21] Appl. No.: 365,765

[30] Foreign Application Priority Data
June 6, 1972 Germany............ 2227398

[52] U.S. Cl.............. 423/465, 423/126, 423/191
[51] Int. Cl......... C01f 7/54, C01b 9/08, C01d 3/02
[58] Field of Search ............ 423/465, 341, 126, 191

[56] References Cited
UNITED STATES PATENTS

| 1,475,155 | 11/1923 | Howard | 423/465 |
|---|---|---|---|
| 1,475,157 | 11/1923 | Howard | 423/465 |
| 1,475,158 | 11/1923 | Howard | 423/465 |
| 1,511,561 | 10/1924 | Howard | 423/465 |

FOREIGN PATENTS OR APPLICATIONS

| 216,473 | 7/1961 | Austria | 423/465 |
|---|---|---|---|
| 1,101,146 | 1/1968 | United Kingdom | 423/465 |

*Primary Examiner*—Edward Stern
*Attorney, Agent, or Firm*—Michael S. Striker

[57] ABSTRACT

Cryolite is made by placing an aqueous aluminum fluoride solution in a reaction vessel, then slowly and simultaneously adding an aqueous sodium salt solution and an aqueous ammonium fluoride solution while vigorously mixing the mass and adjusting the Na:F mol ratio in the added solutions to the range between 1:1 and 1.5:1 and carrying out the reaction at a temperature between 10 and 90°C whereupon the precipitated cryolite is separated from the mass, washed and dried.

4 Claims, No Drawings

PROCESS FOR MAKING CRYOLITE

BACKGROUND OF THE INVENTION

Cryolite is used in large amounts in the aluminum industry. It is known to make cryolite by reaction of sodium fluoride and aluminum fluoride. According to U.S. Pat. No. 3,488,702, cryolite is for instance made by mixing an aqueous aluminum fluoride solution and an aqueous solution of sodium fluoride in any desired sequence and reacting the mass at room temperature. This however results in a cryolite with thixothropic properties which has moderate and up to downright poor filtration properties.

In U.S. Pat. No. 2,916,352 it has been proposed to react an aqueous aluminum fluoride solution in a first stage with an aqueous ammonium fluoride solution in order to form ammonium fluoaluminate and subsequently in a second stage to form sodium fluoaluminate or cryolite by reaction with an aqueous sodium chloride solution. Apart from the fact that this process is rather difficult to carry out the cryolite in this case has also poor filtration properties and is a thixotropic cryolite. The filtration process requires a large amount of time and substantial expense. This impairs the economics of the process.

It is therefore an object of the present invention to form a cryolite of good filtration properties which, in comparison to products obtained by other precipitation processes, contains less water and after drying is obtained with a higher bulk density.

SUMMARY OF THE INVENTION

According to the invention aqueous aluminum fluoride solution is first placed in a reaction vessel and to this solution there are then added slowly and simultaneously an aqueous sodium salt solution and an aqueous ammonium fluoride solution. The mass is meanwhile vigorously mixed. The Na:F mol ratio in the added solutions is adjusted to a range between 1:1 and 1.5:1. The reaction is then carried out at a temperature between 10° and 90°C and the precipitated cryolite is finally separated from the mass, washed and dried.

DESCRIPTION OF THE DETAILS OF THE INVENTION AND OF PREFERRED EMBODIMENTS

Preferably the aqueous sodium salt solution is a sodium chloride solution or a sodium sulfate solution or a mixture of these solutions. The temperature of the reaction preferably is between 30° and 70°C.

The process of the invention is easy to operate and requires comparatively little investment in apparatus. The reaction can be effected in open stirring vessels which for instance may have an internal rubber lining or may be clad with a plastic material. The aqueous aluminum fluoride solution is first placed in the reaction vessel. Preferably the sodium salt solution and the ammonium fluoride solution are then added in a ratio wherein the sodium and fluorine ions available for the reaction with the aluminum fluoride are present in a mol ratio of about 1:1. The concentrations of the two solutions may be selected also as desired. It is however of advantage to provide for the ion concentrations of the solutions at about the same order of magnitude since this simplifies the right dosage of the two solutions. If the sodium salt solution is to be used at an excess it can subsequently be added, e.g. 10 to 20 percent.

It is surprising and unexpected that by simultaneous addition of a sodium salt solution and an ammonium fluoride solution, cryolite is formed with a yield of 97 to 99 percent relative to the initially employed aluminum fluoride and fluorine and with a degree of purity between 98 and 99 percent. The ammonium fluoride in this case is not only the source of fluorine but, in addition, has a catalytic action towards the cryolite crystal formation.

After completion of the reaction it is possible to recover the ammonia from the cryolite filtrate and to reuse it for further making of ammonium fluoride.

The cryolite made by the process of the invention is colorless and crystalline. It can easily be separated by filtration which permits substantial time savings compared with the filtration of cryolites in the prior art processes. The filtration time can be shortened according to the invention to between one-fifth and one-tenth of the time usually employed. This by itself is a substantial improvement. The obtained wet product from the filtration in addition contains only 20 to 30 percent water.

After drying at 120°C a cryolite is obtained which has a bulk density between 700 and 900 g/l depending on the type of making. This implies bulk densities which are more than twice the bulk density of the prior art processes.

The invention will further be illustrated by the following Examples:

EXAMPLE 1

400 ml of a supersaturated aqueous aluminum fluoride solution containing 84 g (1 mol) $AlF_3$ and having a pH of 2.0 were placed in a 2 liter stirring vessel and heated to 60°C. Subsequently 660 ml of a neutral aqueous NaCl solution containing 210 g NaCl (an excess of 20 percent relative to the stoichiometric amount) and 300 ml of an aqueous $NH_4F$ solution containing 111 g (3 mol) $NH_4F$ and having a pH of 8.5 were added during a period of 30 minutes. The addition of both solutions was effected simultaneously and in a manner that the NaCl:$NH_4F$ mol ratio in the reaction solution during the reaction was equal to 1:1. The excess sodium chloride solution was then added subsequently.

After completion of the reaction and cooling to room temperature the mixture which had a pH of 3 was removed by a suction filter in a water jet vacuum and was washed with 400 ml water. The total filtration process required 4.5 minutes and the water wash 1.5 minutes.

The water contents of the wet product from the filtration was 26.1 percent after applying suction for 5 minutes in a water jet vacuum following the filtration and the water wash.

After drying at 120°C a white fine crystalline cryolite was obtained at a yield of 98 percent relative to the fluorine that was added as aluminum fluoride and ammonium fluoride. The cryolite had a degree of purity of 98.0 percent and a bulk density of 860 g/l.

EXAMPLE 2

(Comparative Example)

400 ml of a supersaturated aqueous aluminum fluoride solution containing 84 g (1 mol) $AlF_3$ at a pH of 2.0 were reacted at 60°C in a 2 liter stirring vessel with 300 ml of an aqueous $NH_4F$ solution containing 111 g (3 mol) NH₄F and having a pH of 8.5 so as to form ammonium fluoaluminate.

After completion of the reaction with the NH₄F solution 660 ml of a neutral aqueous NaCl solution containing 210 g NaCl (an excess of 20 percent relative to the stoichiometric amount) were added during half an hour. The mass was then stirred for another 30 minutes and after cooling to room temperature was subjected to a suction filtration by means of a water jet vacuum pump.

The cryolite formed according to this prior art proceeding had thixotropic properties and was very difficult to filter. The filtration required a time of 2 hours and the water wash (in 400 ml) required another hour. The product which was still wet from the filtration contained 52.5 percent water.

The yield of cryolite and the degree of purity were about equal to the results obtained in Example 1. However, the bulk density was only 440 g/l.

EXAMPLE 3

700 ml of a supersaturated aqueous aluminum fluoride solution containing 84 g (1 mol) AlF₃ and having a pH of 2.5 was placed in a reaction vessel as in Example 1. The mass was heated to 40°C. Subsequently 534 ml of a neutral aqueous NaCl solution containing 175 g (3 mol) NaCl and 300 ml of an aqueous NH₄F solution containing 111 g (3 mol) NH₄F and having a pH of 8.7 were simultaneously added during a period of 25 minutes.

After completion of the reaction the mass was subjected to stirring for another 1½ hours and was subsequently filtered, washed with 300 ml water and dried at 120°C.

The entire filtration and water wash was carried out in a total of 4 minutes. The water contents of the wet product from the filtration was 28.2 percent. After drying at 120°C a finely crystalline cryolite was obtained at a yield of 96.2 percent relative to the fluorine that was added as aluminum fluoride and ammonium fluoride. The degree of purity of the cryolite was 98.2 percent. Its bulk density was 750 g/l.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A process for the production of cryolite crystals having a bulk density between 700 and 900 grams per liter which comprises simultaneously adding, to a supersaturated aqueous solution of aluminum fluoride, aqueous solutions of ammonium fluoride and a sodium salt of the group consisting of sodium chloride and sodium sulfate, in such amounts that a ratio between 1 and 1.5 gram atoms of sodium of the sodium salt to each mol of ammonium fluoride is continuously maintained in the reaction mixture and the total amount of each of said solutions that is added is at least sufficient stoichiometrically to convert all of the aluminum fluoride to cryolite, while the reaction mixture is vigorously agitated and its temperature is maintained between 10 and 90°C, and subsequently recovering the cryolite crystals from the resulting reaction mixture.

2. A process as defined in claim 1 in which the ratio of gram atoms of sodium of the sodium salt to mols of ammonium fluoride is 1:1 during the addition of the aqueous solutions thereof to the reaction mixture.

3. A process as defined in claim 2 in which the reaction mixture is maintained at a temperature between 30° and 70°C and, after completion of the addition of the solutions of ammonium fluoride and the sodium salt, an amount of the sodium salt is added to the reaction mixture that is between 10 and 20 percent by weight of that previously added.

4. A process as defined in claim 1 in which the sodium salt is sodium chloride.

\* \* \* \* \*